United States Patent
Zhai

(10) Patent No.: US 9,721,684 B2
(45) Date of Patent: Aug. 1, 2017

(54) SYSTEMS AND METHODS FOR DETECTING A LEAKING FUEL CHANNEL IN A NUCLEAR REACTOR

(71) Applicant: Candu Energy Inc., Mississauga (CA)

(72) Inventor: Ben Bingyl Zhai, Oakville (CA)

(73) Assignee: Candu Energy Inc., Ontario (CA)

( * ) Notice: Subject to any disclaimer, the term of this patent is extended or adjusted under 35 U.S.C. 154(b) by 670 days.

(21) Appl. No.: 14/148,026

(22) Filed: Jan. 6, 2014

(65) Prior Publication Data
US 2014/0205049 A1 Jul. 24, 2014

Related U.S. Application Data

(60) Provisional application No. 61/754,021, filed on Jan. 18, 2013.

(51) Int. Cl.
*G21C 17/07* (2006.01)
*G21C 17/00* (2006.01)
*G21C 17/04* (2006.01)

(52) U.S. Cl.
CPC ........... *G21C 17/002* (2013.01); *G21C 17/04* (2013.01)

(58) Field of Classification Search
CPC ...................................................... G21C 17/07
USPC ......................................................... 376/251
See application file for complete search history.

(56) References Cited

U.S. PATENT DOCUMENTS 2,777,812 A * 1/1957 Powell ................. G21C 17/041
376/251
6,088,417 A * 7/2000 Jax ........................ G01M 3/222
376/250

FOREIGN PATENT DOCUMENTS

CA 2533625 7/2007

OTHER PUBLICATIONS

"Annulus Gas Chemistry Control" KANUPP—IAEA Training, dated Aug. 5, 2003, 25 pages.
Bieman, D., "Course 233—Reactor & Auxiliaries—Module 14—Annulus Gas" Approval Issue, Revision 3 dated Jun. 1992, 12 pages.
Winfield, D., "Reactor, Boiler & Auxiliaries—Course 133 Annulus Gas System," dated Sep. 1975, 3 pages.
Kim, S. et al., "Design of Improved Detection Instrumentation for the Annulus Gas System for Wolsong 2," Journal of the Korean Nuclear Society, vol. 28, No. 4, pp. 424-431, Aug. 1996.

(Continued)

*Primary Examiner* — Sean P Burke
(74) *Attorney, Agent, or Firm* — Michael Best & Friedrich LLP

(57) ABSTRACT

Methods and systems for detecting an individual leaking fuel channel included in a reactor. One system includes a plurality of inlet lines and a plurality of outlet lines. Each of the plurality of inlet lines feeding annulus fluid in parallel to an annulus space of each of a first plurality of fuel channels included in the reactor, and each of the plurality of outlet lines collecting in parallel annulus fluid exiting an annulus space of each of a second plurality of fuel channels included in the reactor. In some embodiments, the system also includes a detector positioned at an outlet of each of the plurality of outlet lines configured to detect moisture in annulus fluid and identify a first position of an individual leaking fuel channel, and an isolation valve positioned at an inlet of each of the plurality of inlet lines operable to stop annulus fluid from circulating through one of the plurality of inlet lines and to identify a second position of the individual leaking fuel channel.

14 Claims, 10 Drawing Sheets

(56) References Cited

OTHER PUBLICATIONS

Dimitrov, L., "ACR Fuel Channel Design," AECL Technologies Inc. Meeting with the USNRC and CNSC, Dec. 2002, 43 pages.
United Kingdom Search Report for Application No. GB1400750.4 dated Aug. 1, 2014 (3 pages).

* cited by examiner

SYSTEMS AND METHODS FOR DETECTING A LEAKING FUEL CHANNEL IN A NUCLEAR REACTOR

FIELD OF THE INVENTION

The present invention relates to detecting leaks in fuel channels of nuclear reactors. More particularly, the invention relates to detecting a leaking fuel channel in a CANDU-type nuclear reactor. The CANDU ("CANada Deuterium Uranium") reactor is a heavy water or light water cooled, heavy-water moderated, fission reactor capable of using fuels composed of natural uranium, other low-enrichment uranium, recycled uranium, mixed oxides, fissile and fertile actinides, and combinations thereof.

SUMMARY

In some embodiments, the invention provides methods and systems for identifying an individual leaking fuel channel in a reactor. One system includes a plurality of inlet lines and a plurality of outlet lines. Each of the plurality of inlet lines feeds annulus fluid in parallel to an annulus space of each of a first plurality of fuel channels included in the reactor. Each of the plurality of outlet lines collects, in parallel, annulus fluid exiting an annulus space of each of a second plurality of fuel channels included in the reactor. In some embodiments, the system also includes a detector positioned at an outlet of each of the plurality of outlet lines configured to detect moisture in annulus fluid and to identify a first position of an individual leaking fuel channel, and an isolation valve positioned at an inlet of each of the plurality of inlet lines operable to stop annulus fluid from circulating through one of the plurality of inlet lines and to identify a second position of the individual leaking fuel channel.

Another embodiment of the invention provides a method of detecting an individual leaking fuel channel included in a reactor. The method includes supplying annulus fluid to the reactor through a plurality of inlet lines and collecting annulus fluid exiting the reactor in a plurality of outlet lines. Each of the plurality of inlet lines feeds annulus fluid to an annulus space of a plurality of fuel channels included in the reactor, and each of the plurality of outlet lines collects, in parallel, annulus fluid exiting an annulus space of each of a second plurality of fuel channels included in the reactor. In some embodiments, the method also includes detecting moisture in annulus fluid at an outlet of one of the plurality of outlet lines to identify a first position of an individual leaking fuel channel and sequentially stopping annulus fluid from circulating through each of the plurality of inlet lines after detecting moisture in annulus fluid to identify a second position of the individual leaking fuel channel.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
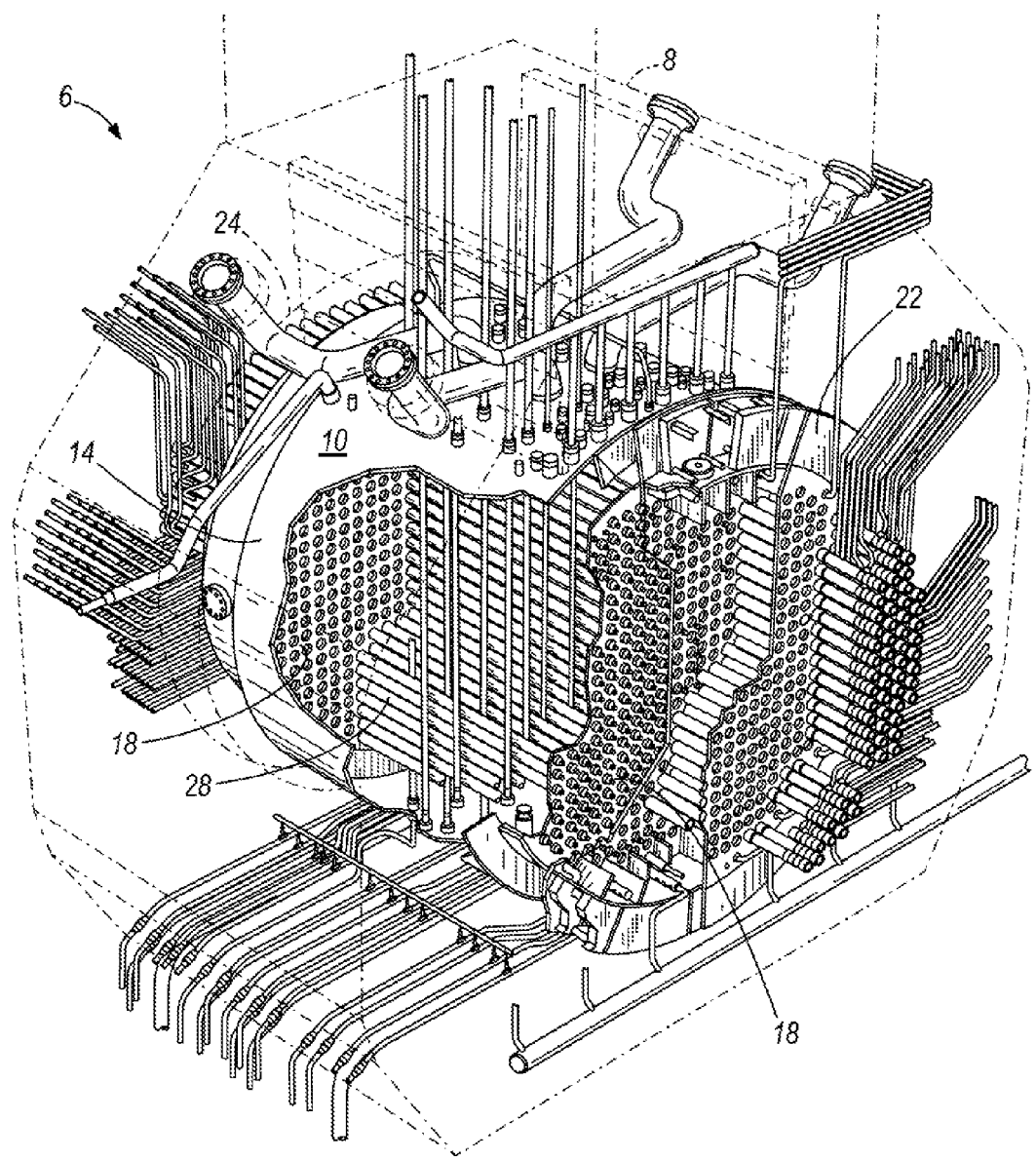
FIG. 1 is a perspective view of a reactor core of a CANDU-type nuclear reactor.
Figure 2:
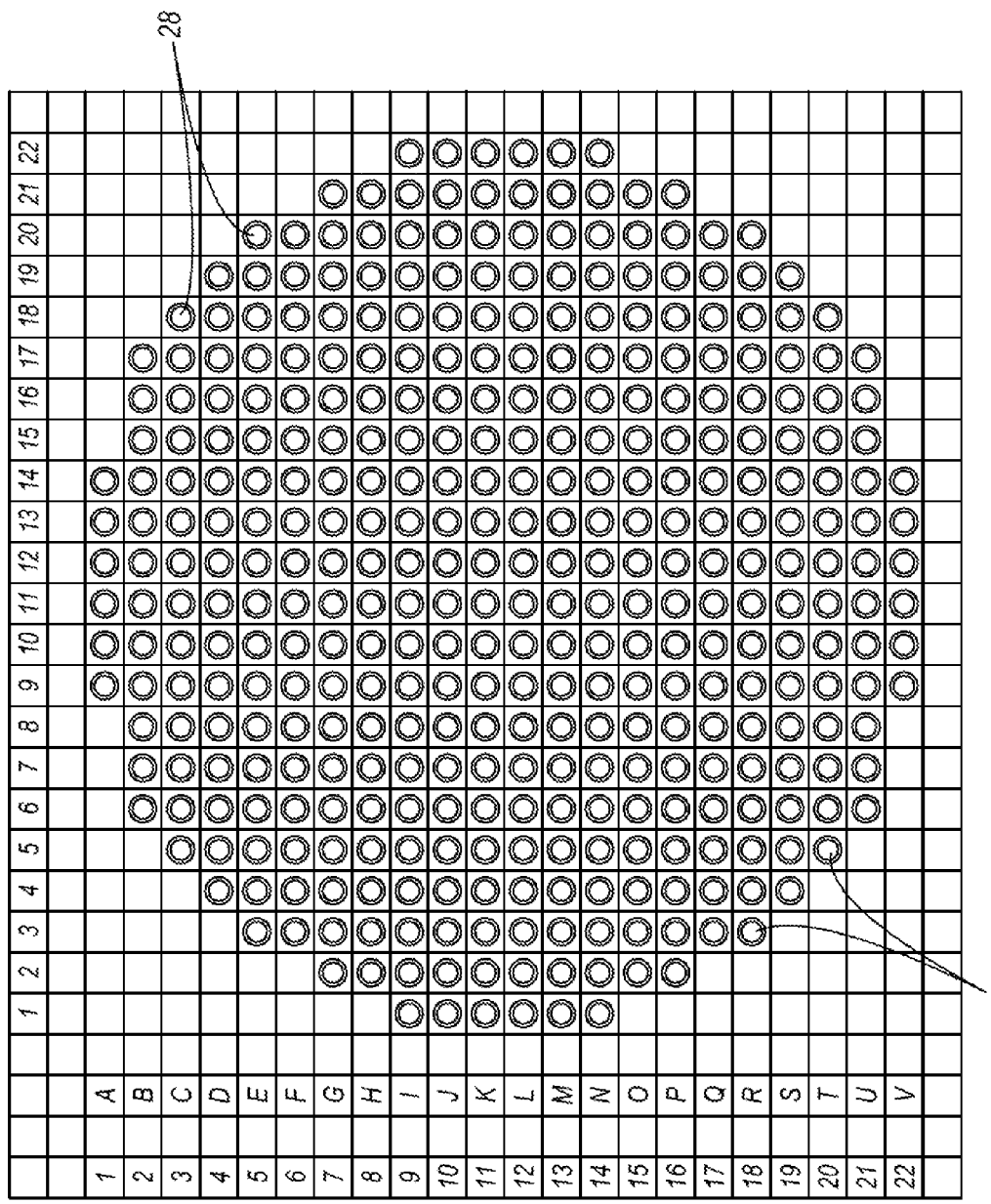
FIG. 2 schematically illustrates fuel channels of a CANDU-type nuclear reactor.

FIG. 1 is a perspective view of a reactor core of a CANDU-type reactor 6. The reactor core is typically contained within a vault 8 that is sealed with an air lock for radiation control and shielding. A generally cylindrical vessel, known as a calandria 10, contains a heavy-water moderator. The calandria 10 has an annular shell 14 and a tube sheet 18 at a first end 22 and a second end 24. The tube sheet 18 includes a plurality of bores that each accepts a fuel channel 28. As shown in FIG. 1, a number of fuel channels 28 pass through the tube sheets 18 of the calandria 10 from the first end 22 to the second end 24. For example, as schematically illustrated in FIG. 2, a CANDU-type reactor can include 380 fuel channels 28, and the fuel channels 28 can be positioned within the calandria 10 in a plurality of rows or horizontal positions (e.g., twenty-two rows labeled A through W in FIG. 2) and a plurality of columns or vertical positions (e.g., twenty-two columns labeled 1 through 22 in FIG. 2).

Figure 3:
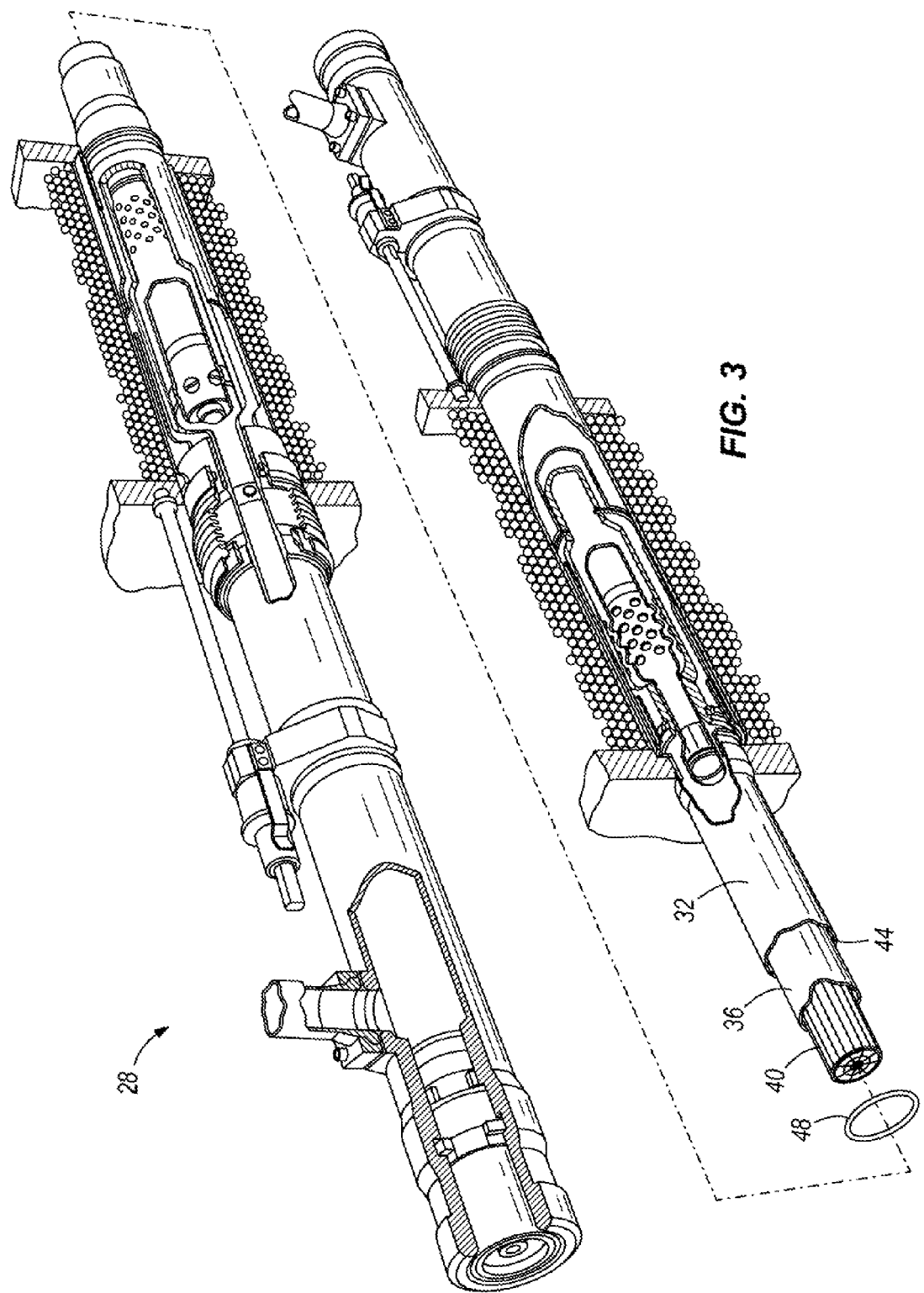
FIG. 3 is a cut away view of a CANDU-type nuclear reactor fuel channel.

FIG. 3 is a cut-away view of the fuel channel 28. As illustrated in FIG. 3, each fuel channel 28 is surrounded by a calandria tube ("CT") 32. The CT 32 forms a first boundary between the heavy water moderator of the calandria 10 and the fuel channels 28. The CTs 32 are positioned in the bores on the tube sheet 18. A pressure tube ("PT") 36 forms an inner wall of the fuel channel 28. The PT 36 provides a conduit for reactor coolant and fuel bundles or assemblies 40. The PT 36, for example, generally holds two or more fuel assemblies 40 and acts as a conduit for reactor coolant that passes through each fuel assembly 40.

An annulus space 44 is defined by a gap between the PT 36 and the CT 32. The annulus space 44 can be filled with a circulating annulus fluid. The annulus fluid can include a gas or a liquid. For example, the annulus fluid can include dry carbon dioxide, helium, nitrogen, air, or combinations thereof. The annulus space 44 and annulus fluid are part of an annulus fluid system ("AFS"). The annulus fluid system forms a boundary between the CT 32 and PT 36 that provides thermal insulation between the hot reactor coolant and fuel bundles 40 within the PTs 36 and the relatively cool CTs 32. The annulus fluid system can also provide an indication of a leaking PT 36 via the presence of moisture, deuterium, or both in the annulus fluid. An annulus spacer or garter spring 48 can be disposed between the CT 32 and PT 36. The annulus spacer 48 maintains the gap between the PT 36 and the corresponding CT 32, while allowing the passage of the annulus fluid through and around the annulus space 44.

Figure 4:
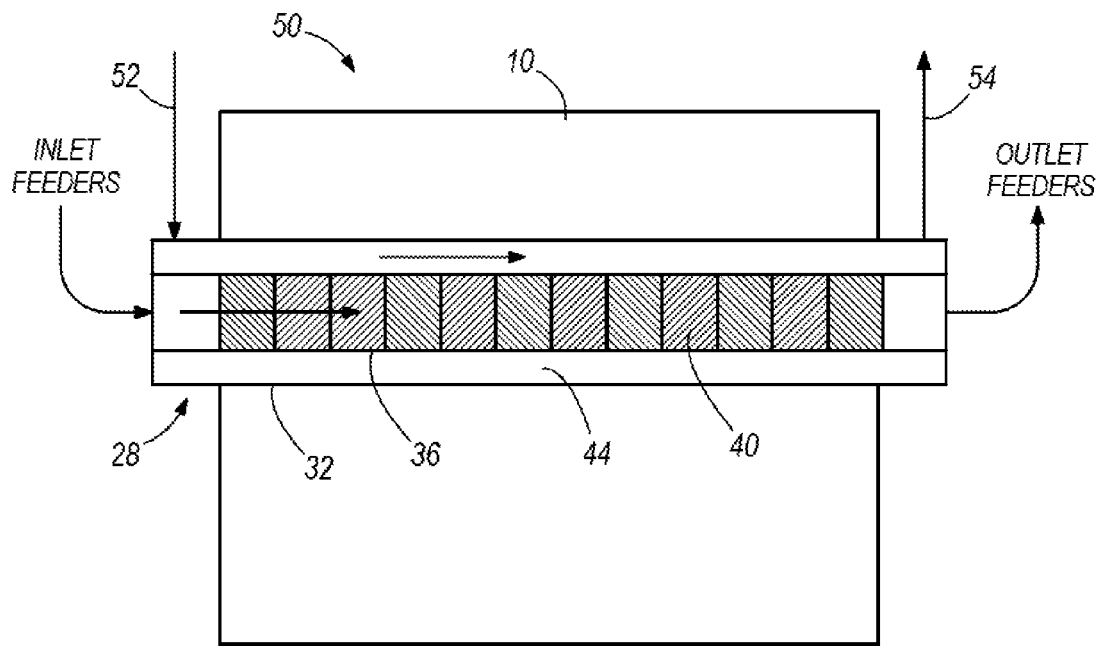
FIGS. 4-8 schematically illustrate an existing annulus fluid system for a CANDU-type nuclear reactor.

FIG. 4 illustrates a portion of an existing annulus fluid system 50. The coolant (e.g., heavy water, $D_2O$) inside the PTs 36 is at high pressure (e.g., approximately 10 MPa or greater), a high temperature (e.g., approximately 260° C. or higher), and is highly radioactive during normal reactor operation. As described above, the PTs 36 are placed inside the CTs 32, which forms the annulus space 44 between each PT 36 and each CT 32. An annulus fluid, such as carbon dioxide ($CO_2$), is then circulated through the annulus spaces 44 within each fuel channel 28 from an inlet tube 52. If any coolant leaks into the annulus space 44 from a PT 36, the coolant vaporizes and the resulting moisture travels along with the annulus fluid to an outlet tube 54. As described below, moisture detectors and dew point analyzers are connected downstream the outlet tubes 54 to detect moisture in the circulated annulus fluid, which indicates a leaking fuel channel 28.

Figure 5:
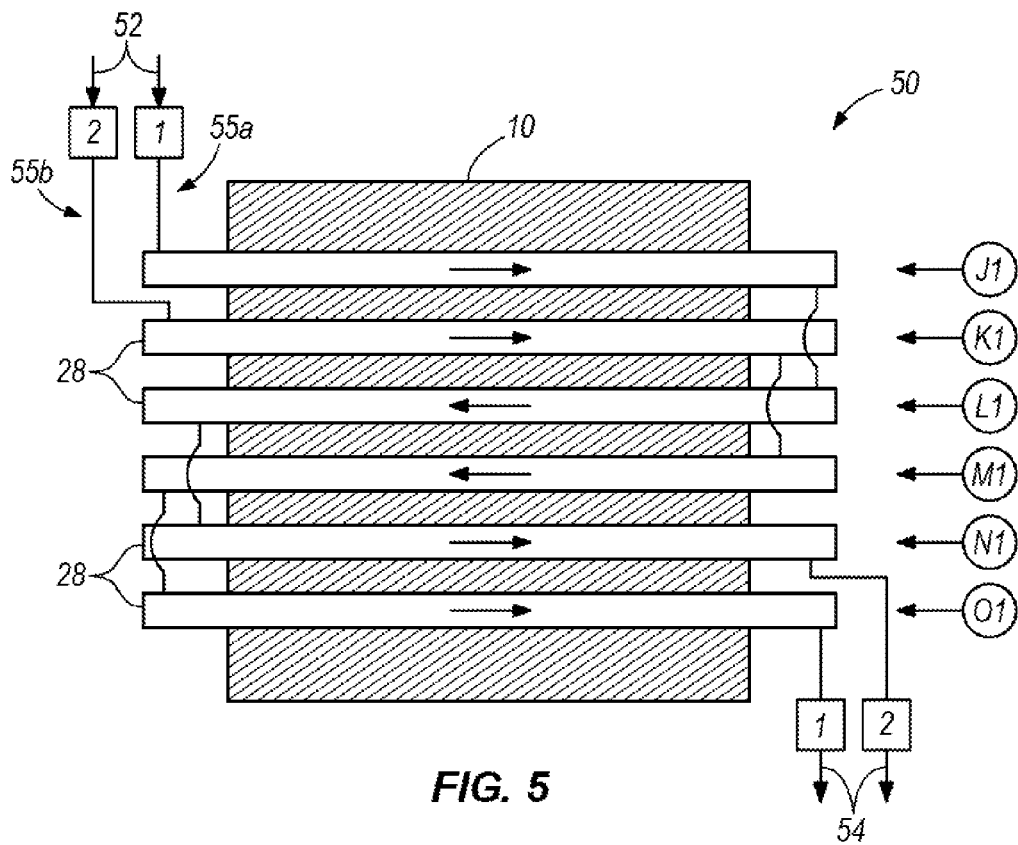

As described above with respect to FIG. 1, the calandria 10 is located inside a vault 8. Therefore, installing an inlet tube 52 and an outlet tube 54 for each fuel channel 28 would require 380 inlet penetrations and 380 outlet penetrations through the vault 8 walls. Accordingly, in some embodiments, the annulus space 44 associated with one fuel channels 28 is serially connected to the annulus space 44 associated with one or more other fuel channels 28 to form a "string" or "line." Therefore, annulus fluid can be circulated through a line to reach multiple fuel channels in series, which reduces the number of inlet tubes 52 and outlet tubes 54. For example, FIG. 5 illustrates a portion of two lines 55a and 55b for a column of fuel channels 28. As shown in FIG. 5, each line 55a and 55b connects alternating rows of fuel channels 28 within a particular column.

Figure 6:
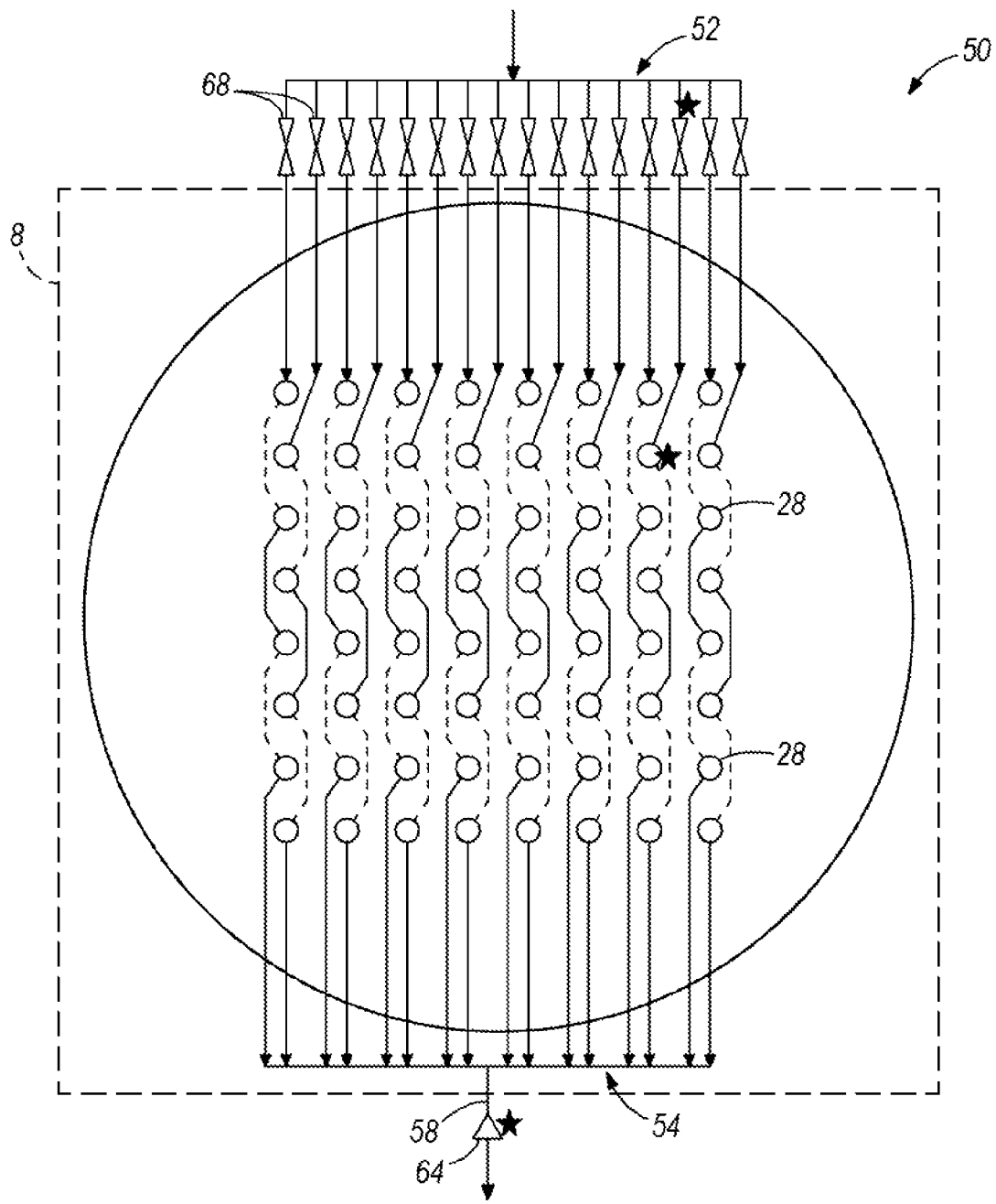

As an additional example, when the reactor 6 includes 380 fuel channels 28 arranged as illustrated in FIG. 2, the first line for the fuel channels 28 positioned in column 1 connects the annulus spaces 44 associated with the fuel channels 28 positioned at rows J, L, and N. The second line connects the annulus spaces 44 associated with the fuel channels 28 at column 1 and rows K, M, and O. Similarly, the first line for column 11 connects the annulus spaces 44 associated with the fuel channels 28 positioned at rows A, C, E, G, J, L, N, P, R, T, and V of column 11, and the second line connects the annulus spaces 44 associated with the fuel channels 28 positioned at rows B, D, F, H, K, M, O, Q, S, U, and W of column 11. Therefore, when the reactor includes 380 fuel channels arranged as illustrated in FIG. 2, each line connects the annulus space 44 of three to eleven fuel channels 28. Accordingly, as schematically illustrated in FIGS. 6, because the AFS 50 includes forty-four inlet tubes 52 and forty-four outlet tubes 54 (rather than 380 inlet tubes and 380 outlet tubes), only forty-four inlet penetrations and forty-four outlet penetrations are required through the calandria vault 8. Furthermore, in some embodiments, as illustrated in FIG. 6, the outlet tubes 54 are combined into a single line and the single line is passed through the vault 8. Therefore, only a single outlet penetration is required through the calandria vault 8 for the AFS 50. It should be understood that only eight rows and eight columns of fuel channels 28 are illustrated in FIG. 6 to simplify the figure.

It should be understood that, in some embodiments, rather than serially connecting alternating rows of fuel channels contained within a particular column, existing annulus fluid systems use a first line that serially connects a first half of the fuel channels 28 in a particular column and a second line that serially connects the second half of the fuel channels 28 in the column. Also, some existing annulus fluid systems use more than two lines per column to serially connect fuel channels 28 contained within the column.

Figure 7:
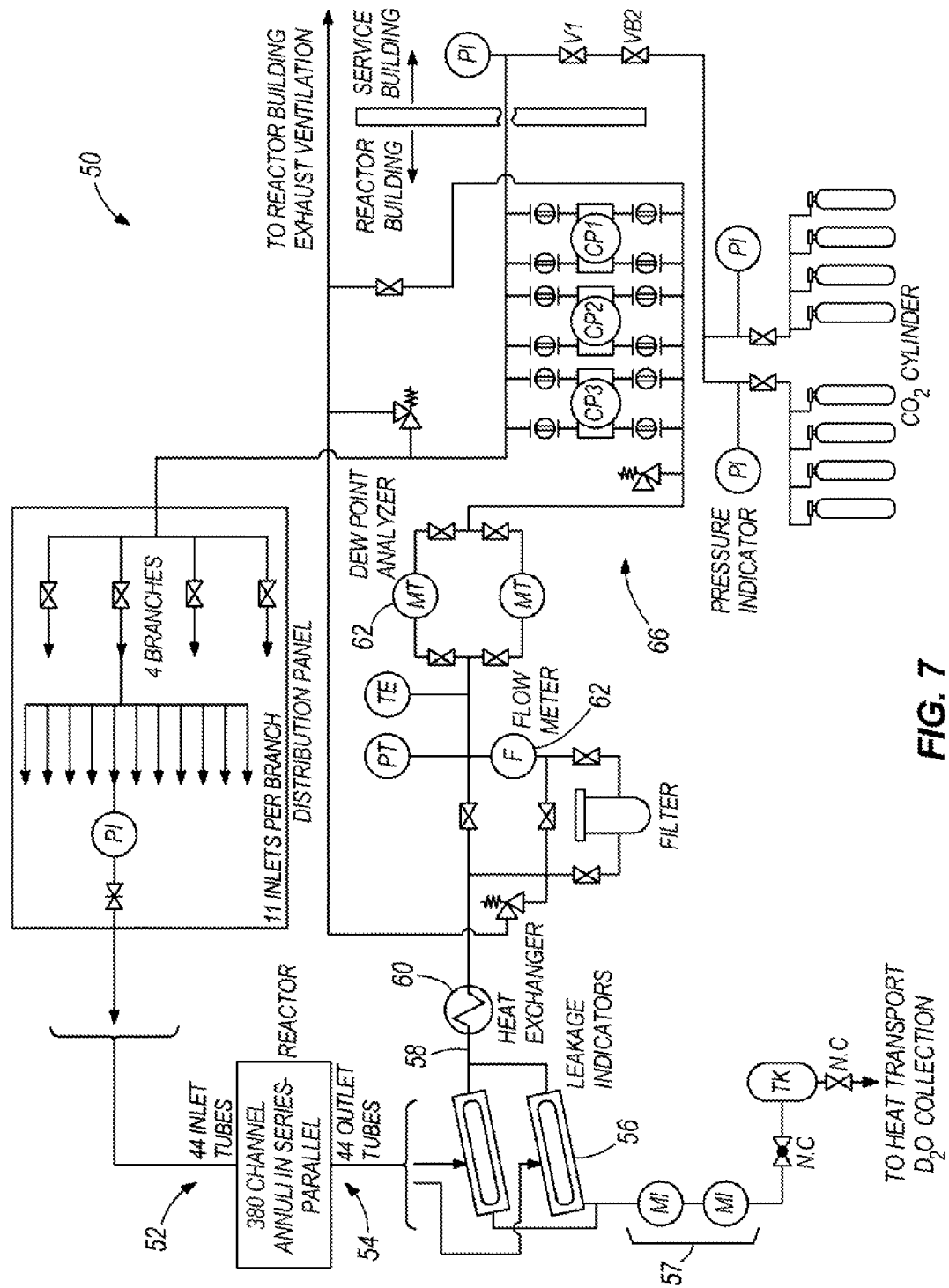

FIG. 7 illustrates the existing AFS 50 including a portion of the system 50 outside of the calandria 10. As shown in FIG. 7, the forty-four outlet tubes 54 are connected to two leakage indicators 56. Coolant leaking into the annulus fluid collects in the leakage indicators 56 and can be seen through windows (e.g., glass windows) in the leakage indicators 56. The collected water then flows to beetles 57 that generate an alarm when liquid exists in the collected water. After the leakage indicators 56, the annulus fluid (i.e., vapor and $CO_2$ gas but not water) is combined into a single line 58 that penetrates the wall of the calandria vault 8. The annulus fluid in the combined line 58 passes through a heat exchanger 60, which reduces the temperature of the annulus fluid. The cooled annulus fluid then passes through a flow meter 62 and through one of two or more dew point analyzers 64. The dew point analyzers 64 can detect moisture, deuterium (e.g., in vaporized form), or both within the annulus fluid. The annulus fluid passing through the dew point analyzers 64 is then pressurized by a compressor 66, split back into forty-four branches, and fed into the forty-four inlet tubes 52. In some embodiments, multiple dew point analyzers 64 are used to detect moisture, deuterium, or both in annulus fluid supplied by one or more lines. Isolation valves installed on the outlet lines 54 can also be used to control the flow of annulus fluid to the one or more dew point analyzers 64.

Although the lines connecting the annulus spaces 44 of multiple fuel channels 28 and the combined single line 58 reduce the number of penetrations required through the calandria vault 8, using these combined lines prevents the AFS 50 from identifying the individual fuel channel that is leaking (e.g., by row and column position). In particular, when the output tubes 54 are combined into the single outlet line 58 as illustrated in FIGS. 6 and 7, the dew point analyzers 64 can only identify whether or not a leak exists within the calandria 10 but cannot identify the particular individual fuel channel that is leaking.

Figure 8:
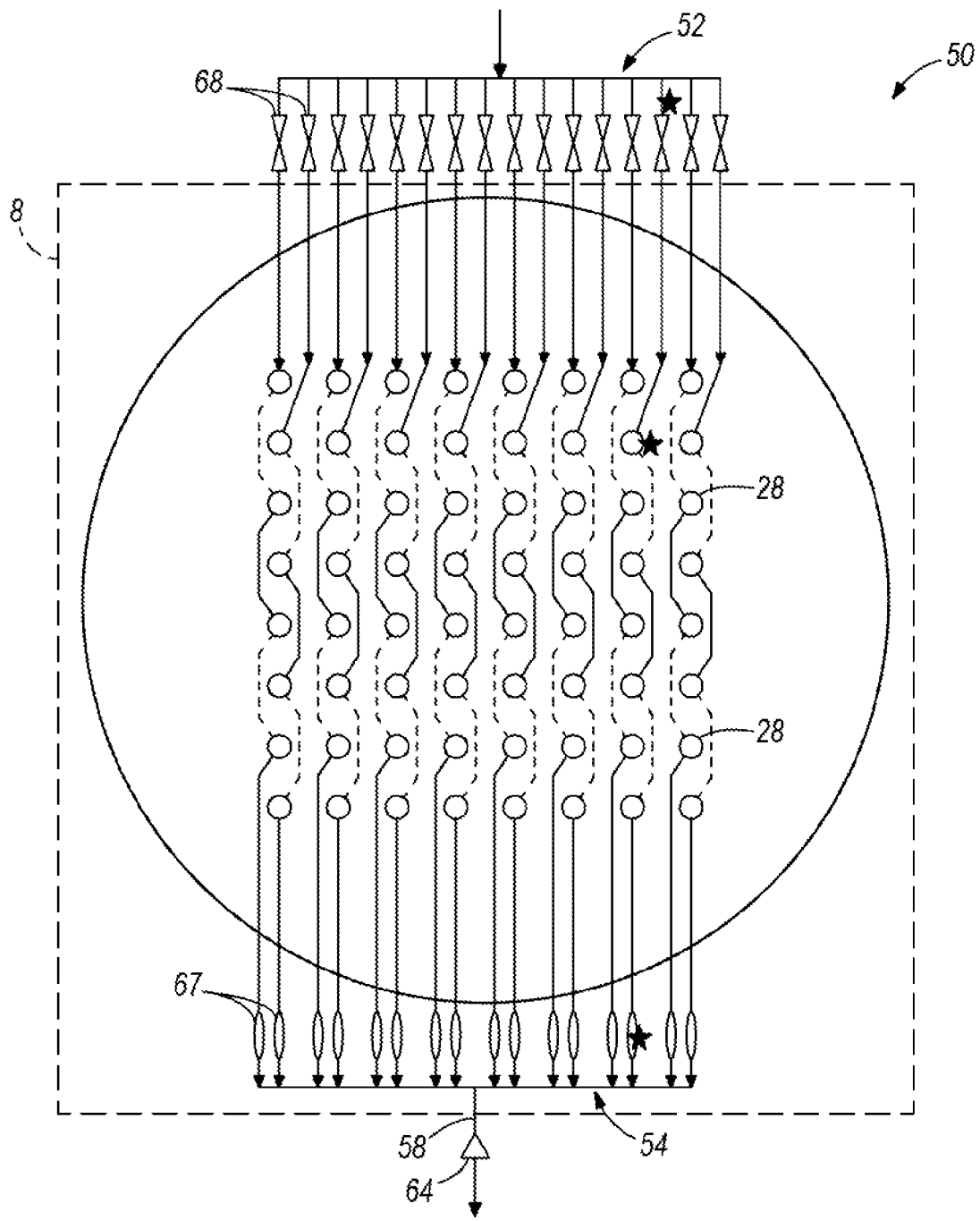

To solve this issue, in some embodiments, a moisture detector 67 is installed on the end of each outlet tube 54 within the vault 8 as illustrated in FIG. 8. Using this configuration, if a leak occurs in a particular fuel channel 28 (e.g., as indicated by the star in FIG. 8), it is detected by the downstream moisture detector 67. Therefore, the particular moisture detector 67 that detects the leak identifies the particular line that includes the leaking fuel channel 28. However, the AFS 50 still cannot identify a particular fuel channel (e.g., by row and column position) within the identified line that is leaking.

Alternatively or in addition, the AFS 50 can include an isolation valve 68 associated with each inlet tube 52 (see FIGS. 6 and 8). The isolation valve 68 can be opened to allow the annulus fluid to flow through the line and can be closed to stop the flow of the annulus fluid through the line. After a leak is initially detected, the AFS 50 can sequentially close each isolation valve 68. When the isolation valve 68 associated with the line containing the leaking fuel channel is closed, the AFS 50 will no longer detect a leak because the annulus fluid will not be circulating through the line that contains the leaking fuel channel 28. Therefore, the AFS 50 can use the isolation valves 68 to identify the particular line that includes the leaking fuel channel 28. Again, even with using the isolation valves 68, the existing AFS 50 can only identify a particular line that includes a leaking fuel channel and cannot identify the individual fuel channel 28 (e.g., by row and column position) within the identified line that is leaking.

Figure 9A:
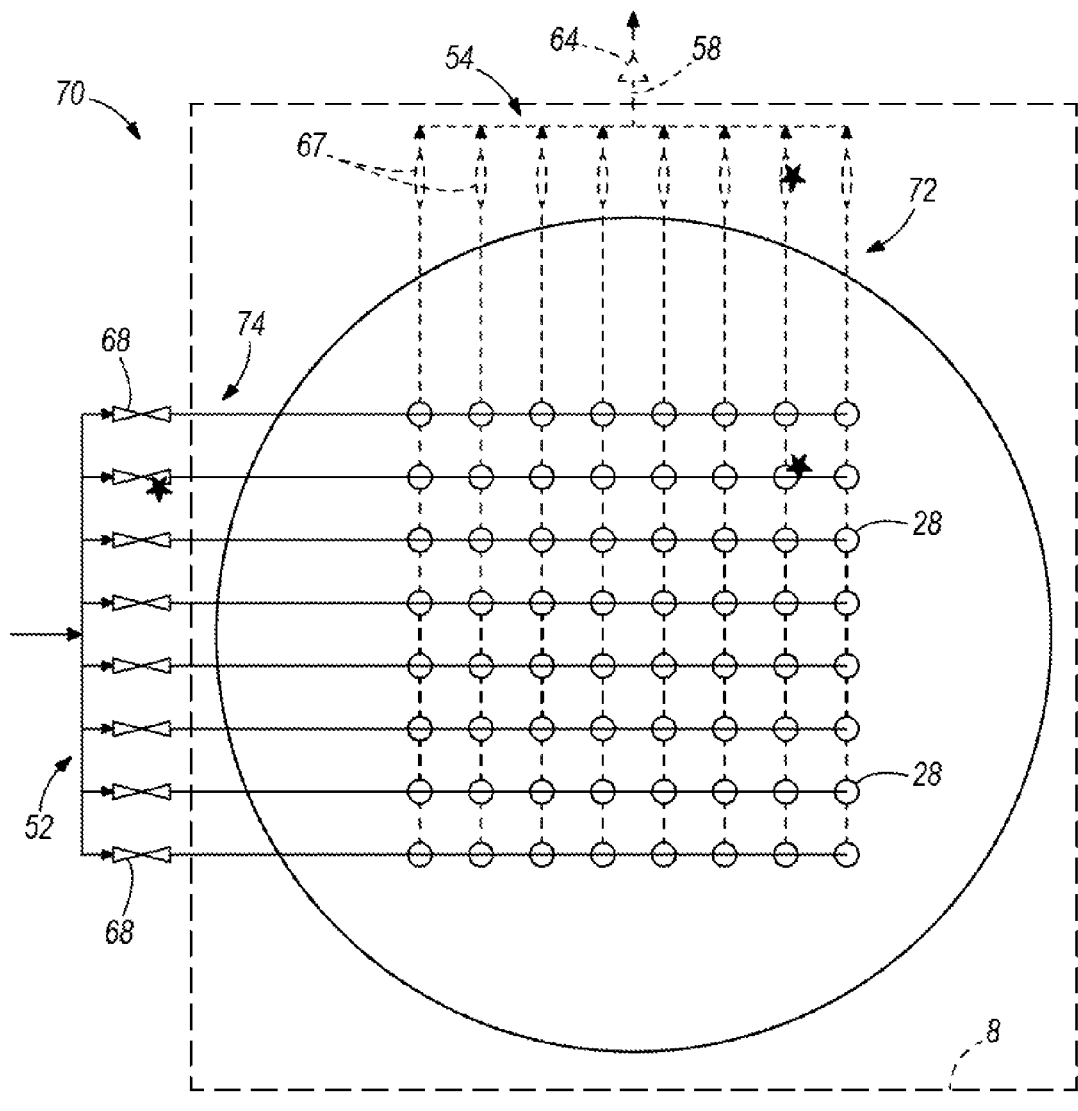
FIGS. 9a-b and 10 schematically illustrate modified annulus fluid systems for a CANDU-type nuclear reactor.
Figure 9B:
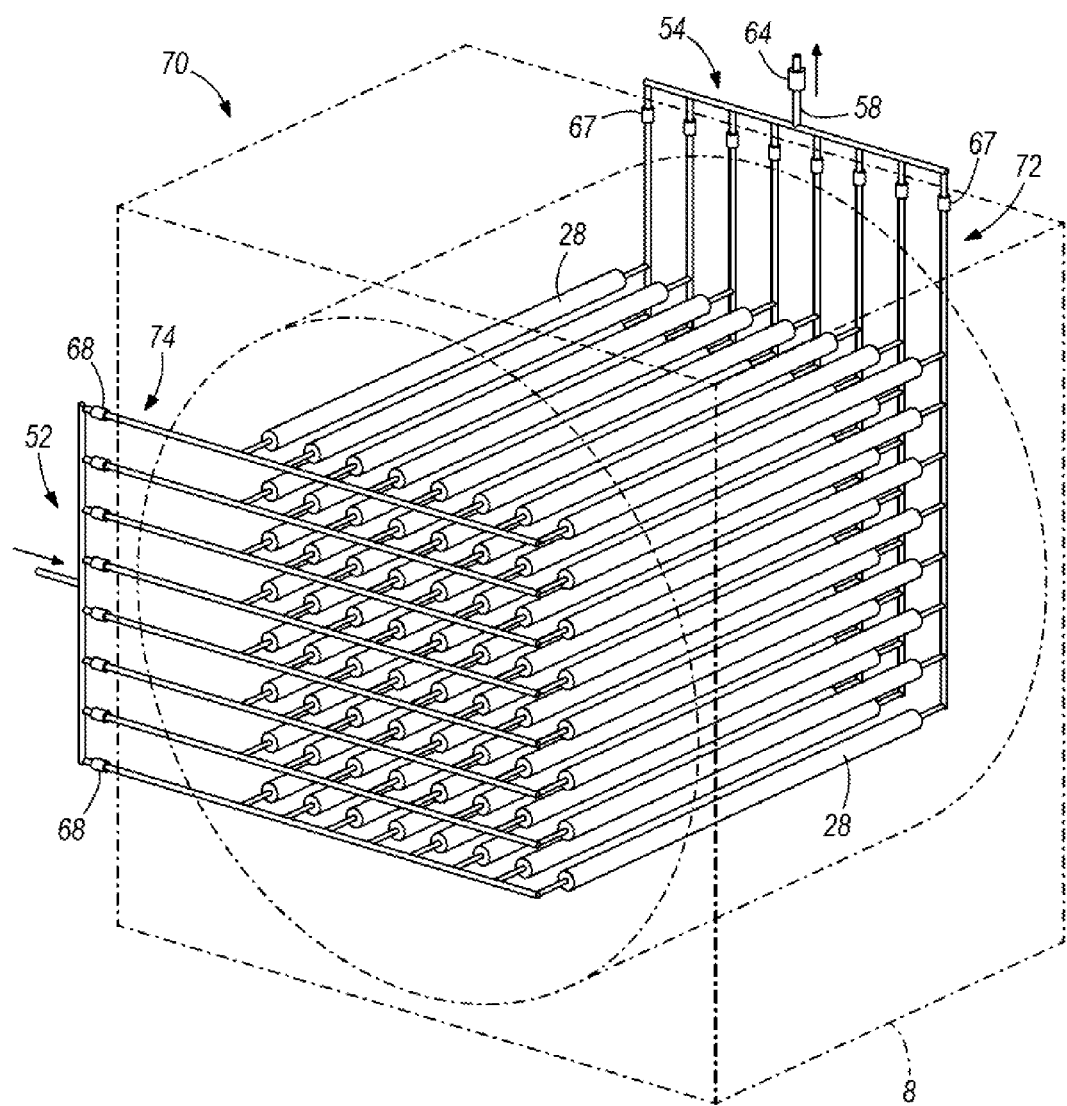

FIGS. 9a-b illustrates a modified AFS 70. In this AFS 70, the portion of the AFS 70 outside of the calandria vault 8 is generally the same as the existing AFS 50 illustrated in FIG. 7. Similar to the AFS 50, the modified AFS 70 can be used with a CANDU-type reactor that includes 380 fuel channels arranged as illustrated in FIG. 2 (i.e., twenty-two columns and twenty-two rows) (however, only eight columns and eight rows are illustrated in FIG. 9a to simplify the figure). Based on this configuration, the AFS 70 includes twenty-two outlet lines 72 and twenty-two inlet lines 74. In some embodiments, the inlet lines 74 are feed horizontally into the reactor 6 through one wall of the vault 8, and the outlet lines 72 exit the reactor 6 vertically through a different wall of the vault 8.

The annulus fluid flows through the forty-four inlet lines and forty-four outlet lines in parallel. In particular, each inlet line 74 feeds annulus fluid, in parallel, into the annulus space 44 of each fuel channel 28 having a common horizontal position (i.e., each fuel channel 28 within the same row). Therefore, annulus fluid from the same inlet line 74 flows through each fuel channel 28 within the same row in parallel. As annulus fluid flows through each fuel channel 28, the annulus fluid exits the fuel channel 28 and enters one of the outlet lines 72. In particular, the annulus fluid exiting each fuel channel 28 having a common vertical position (i.e., each fuel channel 28 within the same column) flows in parallel into the same outlet line 72. Accordingly, each outlet line 72 collects, in parallel, the annulus fluid exiting the fuel channels 28 within the same column.

As shown in FIG. 9a, a moisture detector 67 is installed at the outlet of vertical outlet line 72 that can detect moisture and/or deuterium within the outlet line 72. An isolation valve 68 is also installed on each inlet line 74. As described above, each isolation valve 68 can be closed to stop the annulus fluid from circulating through a particular inlet line 74.

During operation of the AFS 70, if there is a leak in a fuel channel 28 (e.g., indicated by the star in FIG. 9a), the leak is detected by the moisture detector 67 on the outlet line 72 receiving the annulus fluid from the leaking fuel channel 28. Therefore, the vertical position (i.e., the column) of the leaking channel is identified by the moisture detector 67. After the vertical position of the leaking fuel channel 28 is identified, the row of the leaking fuel channel 28 can be determined using the isolation valves 68 installed on the inlet lines 74. In particular, the isolation valves 68 associated with each inlet line 74 can be sequentially closed. When the isolation valve 68 associated with the inlet line 74 that feeds annulus fluid to the leaking fuel channel 28 is closed, the moisture detector 67 that initially detected the leak, will no longer detect a leak. In particular, because annulus fluid is not flowing through the annulus space 44 of the leaking fuel channel 28 (i.e., because the isolation valve 68 is closed), no moisture or deuterium will be carried to and detected by the moisture detector 67. In some embodiments, an isolation valve can also be installed on each outlet line 74 to help identify a leaking fuel channel and prevent cross-bleeding through the grid of fuel channels (e.g., due to a leaking isolation valve).

Accordingly, unlike the existing AFS 50, the AFS 70 identifies the individual fuel channel 28 (i.e., by horizontal or row position and by vertical or column position) that is leaking. In addition, the AFS 70 can identify a leaking fuel channel faster than existing systems. For example, when a leak occurs, the moisture resulting from the leaking coolant travels with the annulus fluid to the downstream moisture detector 67, which takes time. For the existing AFS 50, each line includes multiple fuel channels connected in series. Therefore, in the existing AFS 50, the moisture associated with a leak often travels through multiple fuel channels 28 before reaching a moisture detector 67. In the modified AFS 70, however, because the fuel channels 28 are supplied with annulus fluid in parallel, moisture only needs to travel through a single fuel channel 28 before it is detected by a moisture detector 67. Accordingly, the response time of the modified AFS 70 is faster than the existing AFS 50.

Furthermore, because the modified AFS 70 only includes twenty-two moisture detectors 67 and twenty-two isolation valves 68 (as compared to the forty-four moisture detectors 67 and forty-four isolation valves 68 included in the AFS 50), the modified AFS 70 is less expensive than the existing AFS 50.

Also, it should be understood that the orientations of the inlet and outlet lines illustrated in FIGS. 9a-b can be switched such that the row of the leaking fuel channel 28 is identified first and then the isolation valves 68 are used to identify the column of the leaking fuel channel 28. In this arrangement, the inlet lines 74 can be feed vertically into the vault 8 and the outlet lines 72 can exit the vault 8 horizontally.

Figure 10:
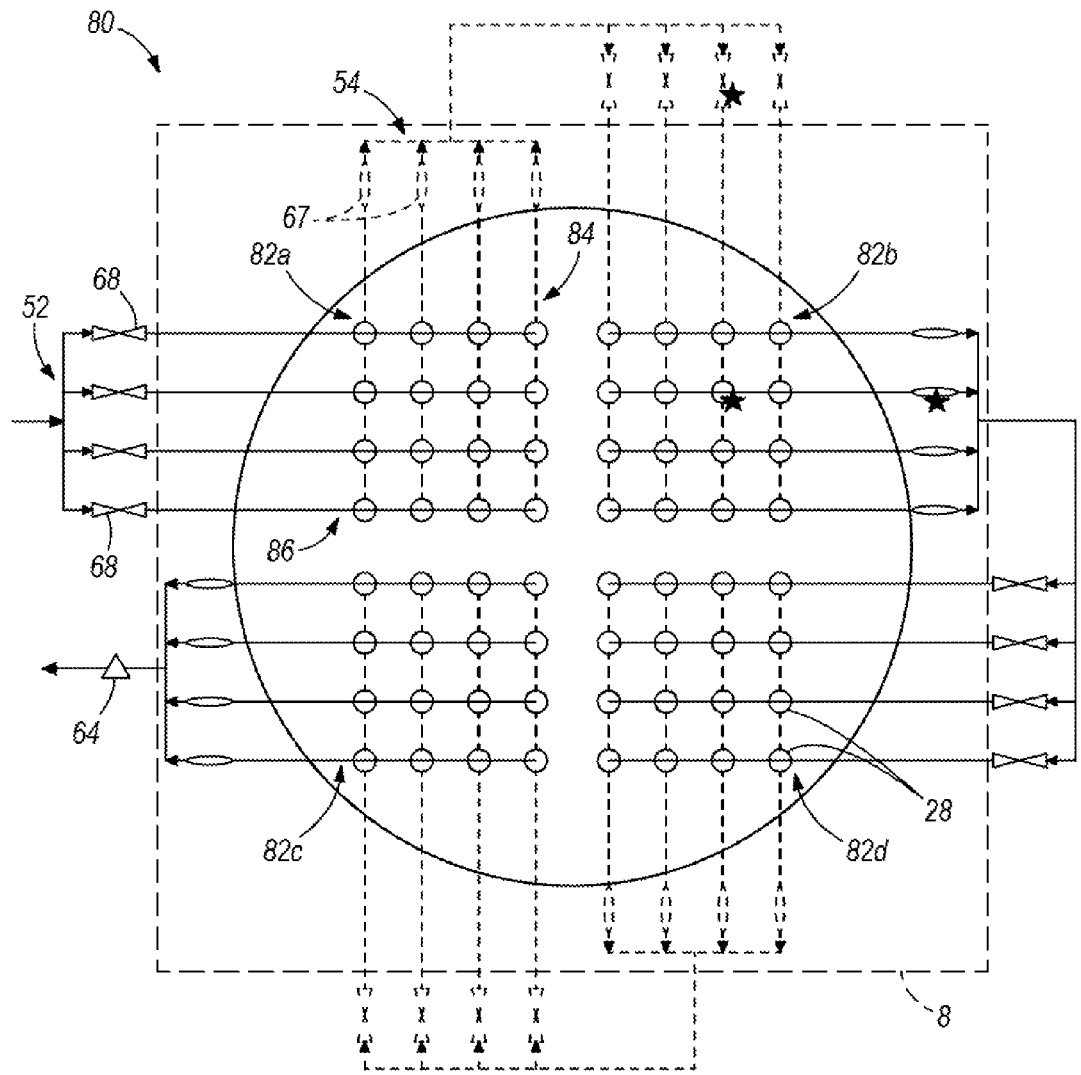

FIG. 10 illustrates another modified AFS 80. The modified AFS 80 can also be used with a CANDU-type reactor that includes 380 fuel channels arranged as illustrated in FIG. 2 (i.e., twenty-two columns and twenty-two rows) (however, only eight columns and eight rows are illustrated in FIG. 10 to simplify the figure). As shown in FIG. 10, the fuel channels 28 are divided into sections, such as four quadrants 82a, 82b, 82c, and 82d. Each quadrant includes eleven outlet lines 84 and eleven inlet lines 86. The inlet lines 86 can be feed into the reactor 6 through one wall of the vault 8 and the outlet lines 84 can exit the reactor through a different wall of the vault 8. Using the inlet lines 86, annulus fluid flows through the fuel channels 28 included in each quadrant in parallel. Also, the outlet lines 84 of each quadrant are serially connected to the inlet lines 86 of another quadrant, with the exception of the last quadrant (e.g., quadrant 82c) where the annulus fluid exits the vault 8 to be processed as described above with respect to FIG. 7.

As shown in FIG. 10, for a first quadrant 82a, each inlet line 86 feeds the annulus fluid, in parallel, into the annulus space 44 of each fuel channel 28 within the same row within the quadrant 82a. As the annulus fluid flows through each fuel channel 28, the annulus fluid exits the fuel channel 28 and enters one of the outlet lines 84. In particular, the annulus fluid exiting each fuel channel 28 within the same column within the quadrant 82a flows, in parallel, into the same outlet line 84. Accordingly, each outlet line 84 collects the annulus fluid exiting the fuel channels 28 within the same column within the same quadrant of the reactor 6.

As also shown in FIG. 10, a moisture detector 67 is installed at the end of each outlet line 84 within the quadrant 82a to detect moisture or vapor within the line. An isolation valve 68 is also installed on each inlet line 86 within the quadrant 82a. As described above, each isolation valve 68 can be closed to stop the annulus fluid from circulating through a particular inlet line 86.

As shown in FIG. 10, the orientations of the outlet lines 84 and the inlet lines 86 can vary from one quadrant to another. For example, for the quadrant 82a, the inlet lines 86 horizontally feed the annulus fluid into the fuel channels 28 with the same column of quadrant 82a and the outlet lines 84 vertically collect the annulus fluid exiting the fuel channels 28 within the same row of the quadrant 82a. Alternatively, for the quadrant 82b, the inlet lines 86 feed the annulus fluid vertically into the fuel channels 28 within the same column of the quadrant 82b and the outlet lines 84 horizontally collect the annulus fluid exiting the fuel channels 28 within the same row of the quadrant 82b.

In operation, each quadrant operates as the AFS 70 system described above. In particular, if a leak takes place in a fuel channel 28 indicated by the star in FIG. 10, it is detected by the downstream moisture detector 67 on the outlet line 84 associated with that quadrant. Therefore, the moisture detector 67 identifies the quadrant of the leaking fuel channel and the column or row of the leaking fuel channel within the quadrant. For example, for the leaking fuel channel 28 illustrated in FIG. 10, the moisture detector 67 detecting the leak identifies the quadrant of the leaking fuel channel 28 (i.e., quadrant 82*b*) and the row the leaking fuel channel 28. Similarly, after identifying the quadrant and the row of the leaking fuel channel 28, the eleven isolation valves 68 on the upstream end of the quadrant are used to identify the row of the leaking fuel channel as described above for the AFS 70. Therefore, the AFS 80 identifies the individual fuel channel (i.e., by horizontal or row position and by vertical or column position) that is leaking.

Similar to the modified AFS 70, in the modified AFS 80, moisture caused by a leaking fuel channel 28 travels through only one fuel channel 28 before reaching a downstream moisture detector 67 as compared to multiple fuel channels 28 in the AFS 50. Therefore, the response time of the modified AFS 80 is faster than the existing AFS 50. In addition, the modified AFS 80 includes 95 parallel lines (380 fuel channels divided into four quadrants) as compared to the 380 parallel lines in the modified AFS 70. As a result, the flow rate of the annulus fluid in a line of the modified AFS 80 is approximately four times greater than the flow rate of the annulus fluid in a line of the modified AFS 70. This means that moisture travels faster in the modified AFS 80 than in modified AFS 70, which increases the response time of the AFS 80. Furthermore, although approximately twenty-two operations are performed to identify an individual leaking fuel channel 28 using the modified AFS 70, only approximately eleven operations are needed to identify an individual leaking fuel channel 28 using the modified AFS 80. Consequently, the response time of the modified AFS 80 is faster than the response time of the modified AFS 70.

Accordingly, in the modified annulus fluid systems 70 and 80, the moisture detectors 67 can respond to leaks much faster than the beetles 57 in the existing annulus fluid systems, which increases the margin for detecting a leak before a break occurs. In addition, because both the AFS 70 and the AFS 80 identify the individual fuel channel that is leaking, an identified leak can be addressed faster and more efficiently using the AFS 70 or the AFS 80 than using existing annulus fluid systems. Furthermore, because the modified annulus fluid systems 70 and 80 include the same or fewer moisture detectors 67 and/or isolation valves 68, the cost of the modified annulus fluid systems 70 and 80 is the same or lower than existing annulus fluid systems 50.

Thus, embodiments of the invention provide, among other things, methods and systems for detecting an individual leaking fuel channel in a nuclear reactor. It should be understood that although a CANDU-type reactor is illustrated in FIGS. 1-10, the leak detection methods and systems also apply to other types of reactors containing similar components as illustrated in FIGS. 1-10. For example, the methods and systems for detecting an individual leaking fuel channel described in the present application can be used with a reactor that includes various numbers of fuel channels, various numbers of fuel bundles within each fuel channel (e.g., 12 or 13 fuel bundles), and various types of heat transport mechanisms. In particular, the disclosed methods and systems can be used in reactors using light water as a primary heat transport mechanism as compared to heavy water.

Also, the details of the methods and systems can be modified according to the specific configuration of the reactor being monitored for leaks (e.g., the specific configuration of fuel channels in the reactor). For example, fuel channels can be divided into more or fewer sections and can include fewer or more inlet and/or outlet lines. In particular, it should be understood that the 44 inlet and outlet lines described above for the AFS 70 are provided as one embodiment of the AFS 70 and different numbers of inlet and outlet lines can be used depending on the reactor core size and the number and arrangement of rows and columns of fuel channels within the reactor. Furthermore, in some embodiments, fuel channels can be connected in different patterns along lines, such as horizontal lines. For example, in general, any pattern of constructing the inlet and outlet lines of the AFS 70 or the AFS 80 can be used where each inlet line is associated with a set of fuel channels that differs from (e.g., by at least one fuel channel) the set of fuel channels associated with each other outlet line.

Various features of the invention are set forth in the following claims.

What is claimed is:

1. A system for detecting an individual leaking fuel channel included in a reactor having an array of fuel channels arranged in columns and rows, each fuel channel including a pressure tube, a calandria tube surrounding the pressure tube, and an annulus space defined between the pressure tube and the calandria tube, the system comprising:
a plurality of inlet lines, each of the plurality of inlet lines feeding annulus fluid in parallel to the annulus spaces of a corresponding plurality of fuel channels of a first grouping type;
a plurality of detectors, each one positioned at an outlet of one of the plurality of outlet lines, each detector configured to detect moisture in annulus fluid;
a plurality of outlet lines, each of the plurality of outlet lines collecting in parallel annulus fluid exiting the annulus spaces of a corresponding plurality of fuel channels of a second grouping type; and
a plurality of isolation valves, each one positioned at an inlet of one of the plurality of inlet lines, each isolation valve operable to close and stop annulus fluid from circulating through one of the plurality of inlet lines,
wherein the first grouping type is either one of a row or a column, and the second grouping type is the other one of a row or a column such that one of the plurality of detectors detecting moisture in the circulating annulus fluid is operable to identify a row or a column of an individual leaking fuel channel and sequential closing of the plurality of isolation valves is operable to identify the other of a row or a column of the individual leaking fuel channel.

2. The system of claim 1, further comprising a detector positioned at an outlet of each of the plurality of outlet lines, each detector configured to detect moisture in annulus fluid and to identify either the row or the column of an individual leaking fuel channel.

3. The system of claim 2, further comprising an isolation valve positioned at an inlet of each of the plurality of inlet lines, each isolation valve operable to stop annulus fluid from circulating through one of the plurality of inlet lines and to identify the individual leaking fuel channel.

4. The system of claim 1, wherein the annulus fluid includes a gas.

5. The system of claim 1, wherein the annulus fluid includes at least one of dry carbon dioxide, helium, nitrogen, and air.

6. The system of claim 1, wherein the plurality of inlet lines enter a vault of the reactor horizontally.

7. The system of claim 6, wherein the plurality of outlet lines exit the vault of the reactor vertically.

8. The system of claim 1, wherein the plurality of inlet lines enter a vault of the reactor vertically.

9. The system of claim 8, wherein the plurality of outlet lines exit the vault of the reactor horizontally.

10. The system of claim 1, wherein the first grouping type is a row and the second grouping type is a column.

11. The system of claim 1, wherein each of the plurality of fuel channels of the first grouping type fed annulus fluid by each of the plurality of inlet lines is located within a first section of the reactor.

12. The system of claim 11, wherein each of the plurality of fuel channels of the second grouping type from which each of the plurality of outlet lines collect annulus fluid is located with the first section of the reactor.

13. The system of claim 12, wherein the plurality of inlet lines is a first plurality of inlet lines and the plurality of outlet lines is a first plurality of outlet lines, the system further comprising a second plurality of inlet lines connected in series with the first plurality of outlet lines, each of the second plurality of inlet lines circulating annulus fluid in parallel through an annulus space of each of an additional plurality of fuel channels arranged in either a column or a row and located in a second section of the reactor, separate from the first section.

14. The system of claim 12, wherein the plurality of inlet lines is a first plurality of inlet lines and the plurality of outlet lines is a first plurality of outlet lines, the system further comprising a second plurality of outlet lines connected in series with the first plurality of inlet lines, each of the second plurality of outlet lines collecting in parallel annulus fluid exiting an annulus space of each of an additional plurality of fuel channels arranged in either a column or a row and located in a second section of the reactor, separate from the first section.

* * * * *